United States Patent [19]
Haley

[11] 3,741,633
[45] June 26, 1973

[54] VEHICLE BLIND SIDE MIRROR SYSTEM

[76] Inventor: Ernest K. Haley, 134 Northwestern Parkway, Louisville, Ky.

[22] Filed: Oct. 13, 1971

[21] Appl. No.: 188,882

[52] U.S. Cl. .................. 350/302, 350/289, 350/299, 350/307
[51] Int. Cl. ............................................. G02b 5/08
[58] Field of Search ............. 350/289, 299, 301–307

[56] References Cited
UNITED STATES PATENTS
| | | | |
|---|---|---|---|
| 3,208,343 | 9/1965 | Prochnow | 350/302 |
| 3,045,551 | 7/1962 | Bonanno | 350/289 |

Primary Examiner—David Schonberg
Assistant Examiner—Michael J. Tokar
Attorney—David H. Semmes

[57] ABSTRACT

A blind side mirror system and apparatus including a fixed mirror and a rotating mirror so combined and operable to provide blind side viewing when backing or turning a semi-trailer. A belt drive is employed to pivot the rotating mirror according as the cab is turned. The mirror system is adjustable, and positioned and controlled from the cab, and can be positioned for view of the blind side when backing and turning in either direction. The mirrors can be rotated to a position where there will be minimum interference when not required. The mirrors are mounted in such a manner as to utilize normal rear view mirrors or direct viewing by the driver.

6 Claims, 4 Drawing Figures

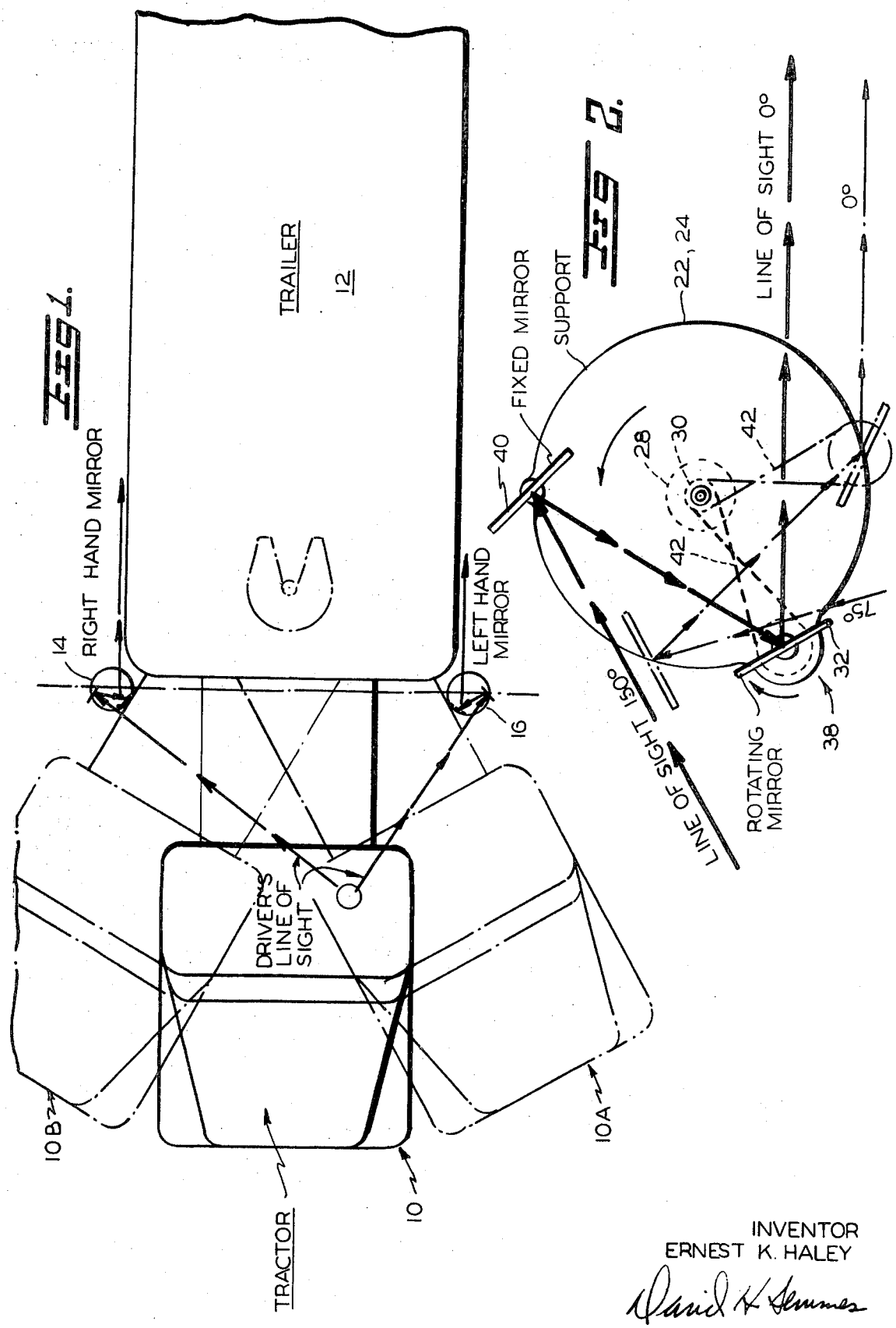

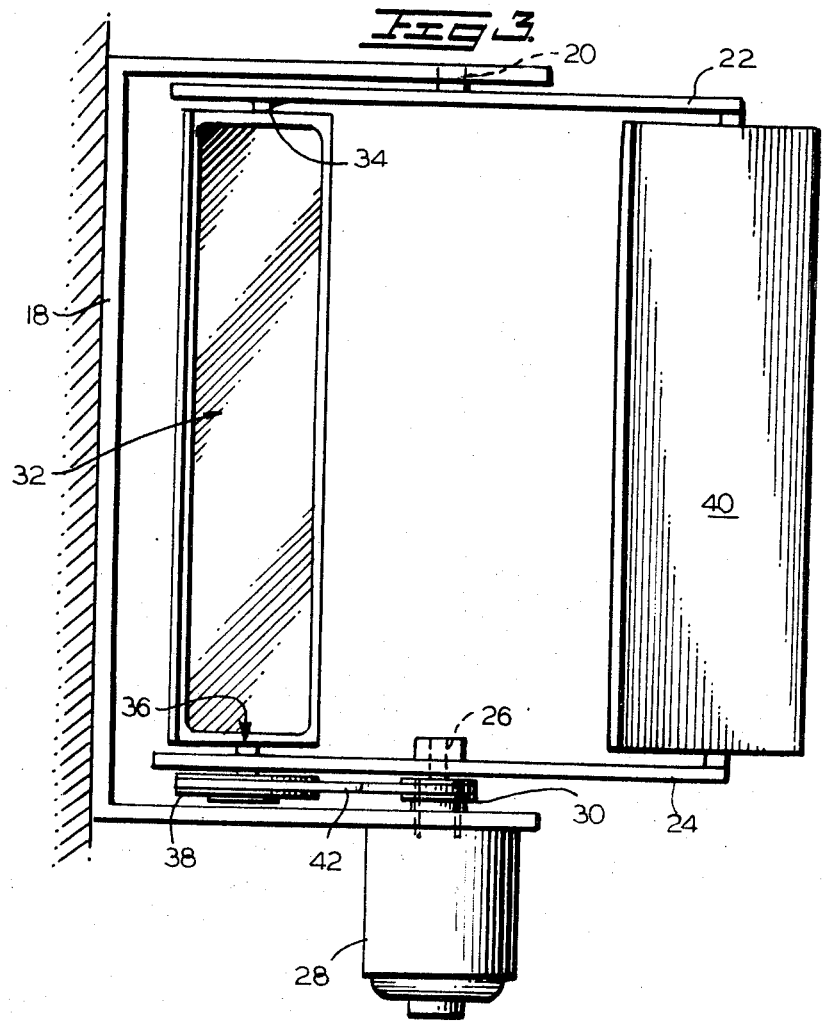
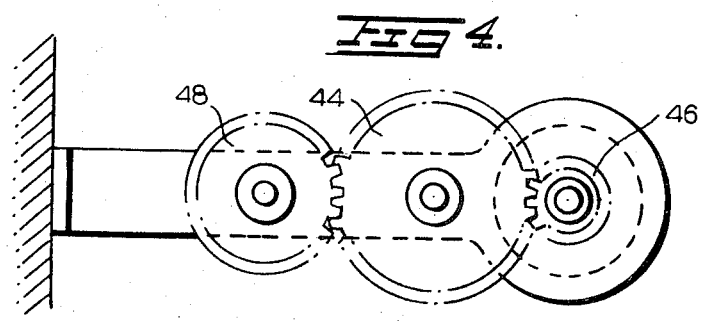

VEHICLE BLIND SIDE MIRROR SYSTEM

BACKGROUND OF THE INVENTION

Heretofore mirror systems for use with semi-trailers and the like, which permit viewing of the vehicle blind side from the cab have been used. Such prior known systems and apparatus however have not been completely satisfactory or as facile as desired.

It is the purpose of the present invention to provide a blind side mirror system which overcomes objectionable features of heretofore known systems, and which gives optimum results in operation.

BRIEF DESCRIPTION OF THE INVENTION

According to the present invention a blind side mirror system is provided especially suitable for use with semi-trailers including a unique mirror assembly including a fixed mirror and a rotating mirror combined to provide blind side viewing when backing or turning. A belt drive system is employed to pivot the rotating mirror accordingly as the cab is turned, and the mirror system is adjustable and positioned and controlled from the cab. The mirrors can be positioned for view of the blind side when backing and turning in either direction, and the mirrors can be positioned to provide minimum interference when not required. The invention contemplates mounting of the mirrors in such a manner as to utilize the normal rear view mirror, or direct viewing by a driver.

Additional objects and advantages of the invention will be more readily apparent from the following detailed description of an embodiment thereof when taken together with the accompanying drawings in which:

FIG. 1 is a schematic plan view showing the present mirror system as applied to a semi-trailer;

FIG. 2 is a schematic view of the mirror system and drive means associated therewith;

FIG. 3 is an elevational view, partly broken away, of the mirror mounting means; and FIG. 4 is a schematic view of optional drive means for the mirror system.

Referring now in more detail to the drawings, FIG. 1 shows a semi-trailer including a cab 10 and trailer 12 of a usual type. The driver position is indicated, and the cab or tractor 10 position during backing or turning is shown in broken lines at 10A and 10B. In order to facilitate an understanding of the principals and operation of the present mirror system, the driver's line of sight is indicated, and designated, in broken lines as also are the sight lines for the mirrors involved.

The system includes a right-hand mirror assembly 14 and a left-hand mirror assembly 16 appropriately mounted with respect to the tractor, with appropriate control interconnections to the cab. As will be seen from FIGS. 2 and 3 each mirror assembly includes a mounting bracket 18, pivotally mounting at 20 an upper mirror support 22, and a lower mirror support 24 is attached to the output shaft 26 of gear motor 28 which can be for example a 12 volt low RPM gear motor. Controls for positioning by operation of the motor are operatively connected to the tractor cab. Motor 28 is mounted on mounting bracket 18. A pulley 30 is attached to the mounting bracket in association with shaft 26. A rotating mirror 32 is pivotally mounted between upper and lower supports 22 and 24 by appropriate upper and lower pivots 34 and 36. A pulley 38 is attached to the rotating mirror lower pivot 36. A fixed mirror 40 is attached between upper and lower supports 22 and 24. Pulley 30 and 38 are operatively interconnected for proper rotation of rotating mirror 32 by means of, for example, a twisted belt drive schematically shown at 42. An optional drive system shown in FIG. 4 will be described hereinafter.

In operation, upon activating motor 28 the mirror supports 22, 24 are rotated and the mirrors circularly moved as indicated in broken lines in FIG. 2. Simultanously, through coaction of pulleys 30 and 38 interconnected by drive 42, the rotating mirror 32 is rotatably controlled in such a manner as to provide the various mirror system lines of sight as indicated in FIG. 2. The driver's line of sight is also appropriately indicated on FIG. 1 of the drawings. In operation the mirror system permits adjustment of the mirror and positioning and control from the cab. It can be positioned to view the blind side when backing and turning in either direction. The mirrors can also be rotated to a position where there will be minimum interference when not required. The mirrors may be mounted in such a manner as to utilize normal rear view mirrors or direct viewing by the driver. The belt drive is employed to pivot the rotating mirror, according as the cab is turned.

An optional drive system is shown in FIG. 4 which includes an idler gear 44, attached to a mounting bracket such as 18, operatively associated with a gear 46 attached to the mounting bracket, and a further gear 48 attached to rotating mirror pivot such as at 36, and operable in a manner similar to pulley 38 in the previous embodiment. The operation of this optional system is similar to that described with respect to FIGS. 2 and 3.

While preferred embodiments have been shown and described, manifestly minor changes in details of construction can be effected without departing from the spirit and scope of the invention as defined in and limited solely by the appended claims.

I claim:

1. A blind side mirror system for combination vehicles such as semi-trailers, including a tractor and a trailer comprising:

A. a revolvable support having a vertical axis of rotation fixedly positioned outboard of the longitudinal sides of said trailer;

B. means for selectively controllably revolving said support independently of said tractor and trailer and the angular relationship therebetween;

C. a fixed mirror mounted on said revolvable support in a fixed position thereon, and movable in a fixed circle with and upon revolving said support;

D. a rotatable mirror rotatably mounted in a fixed position on said revolvable support and movable with and upon said support in said fixed circle upon revolving said support, and;

E. drive means interconnecting said support revolving means and said rotatable mirror for angularly rotating said rotatable mirror about the axis thereof on and with respect to said revolvable support and with respect to said fixed mirror thereon simultaneous with revolution of said support in a coupled controlled synchronized angular position adjustment of said rotatable mirror with respect to said fixed mirror to correlate and adjust the lines of sight between said mirrors for unobstructed rear viewing along the trailer sides and behind the trailer from the tractor.

2. A mirror system as claimed in claim 1, including bracket means attachable with respect to said trailer, a controllable electric motor mounted on said bracket and having an output shaft extending therethrough, said support means including an upper support pivotally mounted in said bracket and a lower support attached to said output shaft of said motor, said motor upon actuation simultaneously and conjointly revolving said supports and the mirrors mounted thereon.

3. A mirror system as claimed in claim 2, said fixed mirror being interconnected and fixed between said upper and lower supports, upper and lower pivots mounting said rotating mirror between said upper and lower supports, a pulley attached to said mounting bracket, a pulley attached to said rotating mirror lower pivot, and interconnecting drive means between said pulleys operable for compensating rotation of said rotating mirror upon rotation of said support means.

4. A mirror system as claimed in claim 3, wherein a twisted belt drive interconnects said pulleys for rotation of said rotating mirror.

5. A mirror system as claimed in claim 3, wherein the drive means for the rotating mirror includes an idler gear attached to said mounting bracket, a first gear attached to said mounting bracket in operative association with said idler gear, and a second gear attached to said rotating mirror pivot operatively engaged with said idler gear for operable rotation of said rotating mirror.

6. A mirror system as claimed in claim 3, wherein the cab of said tractor includes a rear view mirror, said mirror system being so mounted as to permit use in conjunction with said rear view mirror, or direct viewing by a vehicle operator in said cab.

* * * * *